United States Patent [19]

Stuecker et al.

[11] Patent Number: 4,879,793
[45] Date of Patent: Nov. 14, 1989

[54] METHOD OF MANUFACTURING TURBINE WHEEL DISKS WITH LOCALLY HIGH INTERNAL COMPRESSIVE STRAINS IN THE HUB BORE

[75] Inventors: Erwin Stuecker, Essen-Frintrop; Gerhard Roettger, Muelheim/Ruhr, both of Fed. Rep. of Germany

[73] Assignee: Siemens Aktiengesellschaft, Munich, Fed. Rep. of Germany

[21] Appl. No.: 168,670

[22] Filed: Mar. 16, 1988

[30] Foreign Application Priority Data

Mar. 16, 1987 [DE] Fed. Rep. of Germany ....... 3708507

[51] Int. Cl.$^4$ .............................................. B23P 15/04
[52] U.S. Cl. .................................. 29/156.8 R; 72/342; 72/364; 416/244 A
[58] Field of Search ..................... 29/156.8 R; 72/342, 72/364, 370; 416/244 A

[56] References Cited

U.S. PATENT DOCUMENTS 4,602,411  7/1986  Brown .................................. 72/342

FOREIGN PATENT DOCUMENTS 1947272  4/1970  Fed. Rep. of Germany .
2352441  4/1975  Fed. Rep. of Germany .
8604333  8/1986  Fed. Rep. of Germany .

Primary Examiner—Howard N. Goldberg
Assistant Examiner—Frances Chin
Attorney, Agent, or Firm—Hebert L. Lerner; Laurence A. Greenberg

[57] ABSTRACT

A method for manufacturing parts for rotary machines, especially turbine wheel disks, having a hub bore in a hub region, as well as turbine wheel disks manufactured by the method, includes pre-turning a contour at the hub region having a profile differing from a hub contour to be produced. At least the hub region is initially treated. At least the hub region having the pre-turned contour is cooled with a coolant fluid after the initial treatment to produce internal compressive strains in the hub region. The pre-turned contour is reduced after the cooling to the hub contour to be produced.

4 Claims, 1 Drawing Sheet

METHOD OF MANUFACTURING TURBINE WHEEL DISKS WITH LOCALLY HIGH INTERNAL COMPRESSIVE STRAINS IN THE HUB BORE

BACKGROUND OF THE INVENTION

1. Field of the Invention

The invention relates to a method for manufacturing parts for rotary machines, especially turbine wheel disks, having a hub bore, as well as turbine wheel disks manufactured by the method, wherein the hub region or the entire part is cooled with a coolant fluid, preferably water, in order to product internal compressive strains in the hub region after the initial treatment, for instance at temperatures of approximately 600° C. In particular, the invention relates to the manufacture of turbine wheel disks for low-pressure rotors, which have bores for receiving twist-prevention bolts.

Internal compressive strains in the vicinity of the surface of hub bores are known to lessen the danger of stress corrosion. Areas threatened by stress corrosion include those surrounding of twist-prevention bores in turbine rotors.

2. Description of the Related Art

It is known from the prior art to subject metal parts of rotary machines having a hub bore to an initial treatment at temperatures of approximately 600° C., for example. In combination with this treatment, it is also known to cool down the hub region of such a part with a cooling fluid, preferably water, faster than the remaining region of the part. The hub region that is chilled first is subjected to severe pressure during the cooling of the remaining part, resulting in internal compressive strains. However, with the usual geometries of rotating parts, especially turbine wheel disks, an internal compressive strain profile arises during this treatment which, as will be described in further detail below with reference to the drawing, exhibits the most severe internal compressive strains in the center of the hub bore, while the least internal compressive strains arise in the axially outer regions of the hub bore. Such a profile is not necessarily optimal in terms of the strains that occur subsequently, because the twist-prevention bores, for example, are disposed in the outer regions. No provisions for changing the profile of tangential internal compressive strains have been known heretofore.

SUMMARY OF THE INVENTION

It is accordingly an object of the invention to provide a method of manufacturing turbine wheel disks or parts for rotary machines with a profile of locally high internal compressive strains in the hub bore, which overcomes the hereinafore-mentioned disadvantage of the heretofore-known methods and devices of this general type and especially in which the maximum negative internal compressive strains are in the outer regions of the hub bore, as seen in the axial direction. It is also an object of the invention to provide a method for varying the axially extending profile of the tangential internal compressive strains in the interior of the hub region.

With the foregoing and other objects in view there is provided, in accordance with the invention, a method for manufacturing parts for rotary machines or turbine wheel disks having a hub bore in a hub region, which comprises pre-turning a contour at the hub region having a profile differing from a hub contour to be produced, initially treating at least the hub region such as at temperatures of approximately 600° C., cooling at least the hub region and possibly the entire part having the pre-turned contour with a coolant fluid, preferably water, after the initial treatment to produce internal compressive strains in the hub region, and reducing the pre-turned contour after the cooling to the hub contour to be produced.

The essence of the invention is that during the cooling process, the hub bore has an axial profile, hereinafter called the pre-turned contour, which is different than the later finished part. Through differently constructing the pre-turned contour, during the cooling of the hub region and later cutting down the contour until reaching the contour to be finally produced, the distribution of tangential internal compressive strains in the hub region can be varied within wide limits. In particular, it is possible, at least in some regions, to attain higher tangential internal compressive strains than would be attainable with conventional methods by rapid cooling of the entire part or of the hub region. As will be explained in further detail in conjunction with the drawing, the pre-turned contour acts like an internal thrust collar that is later removed. Cutting down the pre-turned contour causes the wheel disk to yield inward (which clearly is equivalent to the removal of a thrust ring), and by means of the variable thickness of the cut-down contour, the distribution of the internal compressive strains in the hub region is varied considerably. In regions where little material is later cut down, the tangential internal compressive strains increase, while in the regions where a great deal of material is cut down, they decrease. This graphic observation already shows how a pre-turned contour must be constructed qualitatively, in order to attain a particular axial profile of tangential internal compressive strains.

For the primary application of the invention, namely the manufacture of turbine wheel disks, high tangential internal compressive strains in the axially outer region of the hub bore are a critical factor and therefore in order to attain the desired effect later, the maximum oversize of the pre-turned contour must be in the central region of the hub bore.

In accordance with another mode of the invention, there is provided a method which comprises performing the step of pre-turning the contour by forming regions of the pre-turned contour being oversized by a given amount as compared to the hub contour to be produced, and by forming at least one additional ring being oversized as compared to the hub contour to be produced by an amount greater than the given amount.

In accordance with a further mode of the invention, there is provided a method which comprises performing the step of pre-turning the contour by forming remaining regions of the pre-turned contour being oversized by approximately 5 to 50 mm and preferably 10 mm as compared to the hub contour to be produced, and by forming at least one substantially central additional ring being oversized as compared to the hub contour to be produced by approximately 50 to 150 mm and preferably 70 mm.

In accordance with an added mode of the invention, there is provided a method which comprises forming the regions of the pre-turned contour being oversized by a given amount as compared to the hub contour to be produced as axially outer regions of the pre-turned contour.

Furthermore, pre-turned contours other than those given by way of example here are possibly at any time, if the profile of internal compressive strains to be produced must meet other requirements. Quantification of the pre-turned contours necessary for a desired profile is within the competence of one skilled in the art.

With the objects of the invention in view there is also provided a turbine wheel disk, comprising a hub having a hub bore formed therein defining an inner surface of the hub at the hub bore, at least part of the inner surface having tangential internal compressive strains greater than would be attainable by inside cooling in the vicinity of the inner surface after an initial treatment and preferably substantially between 300 and 400N/mm$^2$.

In accordance with another feature of the invention, the tangential internal compressive strains are greatest in axially outer regions of the hub bore.

In accordance with a concomitant feature of the invention, the tangential internal compressive strains are substantially 150 to 250N/mm$^2$ in the center of the hub bore and substantially 250 to 400N/mm$^2$ in outer regions thereof.

Other features which are considered as characteristic for the invention are set forth in the appended claims.

Although the invention is illustrated and described herein as embodied in a method of manufacturing turbine wheel disks with locally high internal compressive strains in the hub bore, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings.

DETAILED DESCRIPTION OF THE PREFERRED EMBODIMENTS

Figure 1:
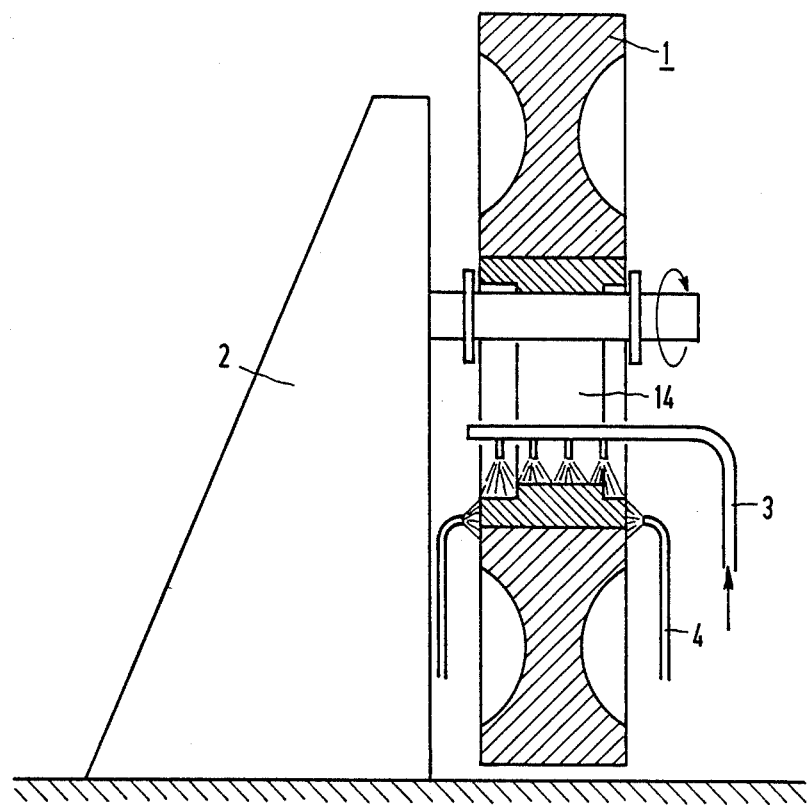
FIG. 1 is a diagrammatic, longitudinal-sectional view of a turbine wheel disk after the initial treatment at the time of internal cooling by means of water.

Referring now to the figures of the drawings in detail and first, particularly, to FIG. 1 thereof, there is seen a wheel disk 1 mounted on a rotational device 2 after an initial treatment. A wheel disk of this kind may, for example, be made of 26 NiCrMoV 145 and can be heat-treated at a temperature of approximately 600° C. The wheel disk is cooled down with a cooling fluid which is typically water, from spray devices 3, 4, while rotating slowly and constantly on the inside of a hub bore 14. According to the invention, the hub bore 14 has an axial profile, the so-called pre-turned contour, that deviates from the finished contour.

It is also noted that the desired effect can be attained by plunging the entire wheel disk (as it is suspended horizontally) into a coolant.

Figure 2:
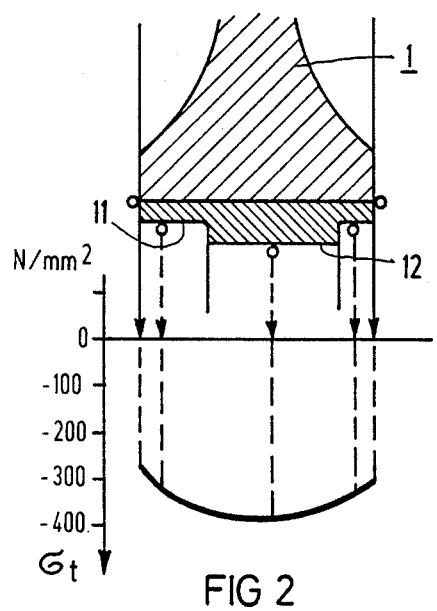
FIG. 2 is a fragmentary, longitudinal-sectional view of the hub region of a wheel disk with a pre-turned contour according to the invention and the associated axial profile of tangential internal compressive strains in the vicinity of the hub bore.

In FIG. 2, a suitable pre-turned contour is shown by way of example, with the resultant axial profile of tangential internal compressive strains after the cooling. The pre-turned contour is only slightly oversized in an axially outer region 11 of the hub bore, as compared with the final contour to be produced. Meanwhile a central region 12 is very much more oversized, for example approximately 50 to 100 mm and preferably approximately 70 mm. The central region forms a kind of additional ring 12, which braces the wheel disk on the inside like a thrust ring. The location and form of the additional ring 12 affects the profile of internal compressive strains that is later produced. Depending on the desired profile, a plurality of additional rings can also be provided, or the width, oversize and/or shape of the additional ring can be varied.

Figure 3:
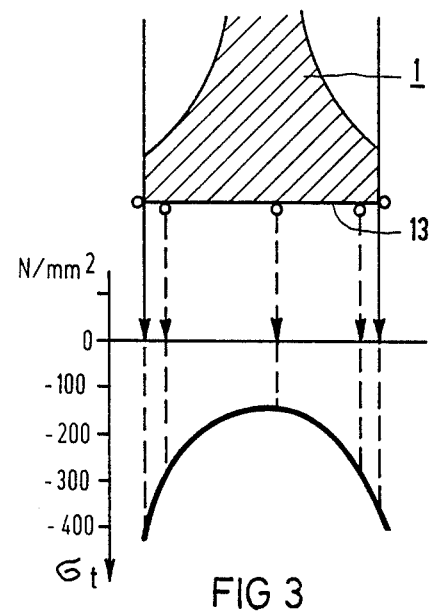
FIG. 3 is a view similar to FIG. 2 of the wheel disk and the profile of the tangential internal compressive strains after removal of the pre-turned contour down to the finished contour.

Once the pre-turned contour 11, 12 is finally cut down, by which time a finished contour 13 as shown in FIG. 3 is produced, the bracing action of the additional ring then vanishes, and as a result the disk yields inward. The result is the profile of tangential internal compressive strains shown in FIG. 3, which has the following characteristics:

(a) The maximum tangential internal compressive strains are located in the axially outer regions of the hub bore; they are substantially greater in this region than before, and optionally even greater than the maximum negative internal compressive strains prior to removal of the pre-turned contour.

(b) The central region of the hub bore has less tangential internal compressive strains than before and less than the outer regions.

(c) The more the material which was cut down from the pre-turned contour in the region involved in order to attain the finished contour, the lesser are the tangential internal compressive strains.

The invention makes it possible to vary the axial profile of tangential internal compressive strains in the hub bore of rotating parts, in particular wheel disks for low-pressure turbine rotors, in an prescribed manner. In this way, intentionally high tangential internal compressive strains can be attained in regions threatened by stress corrosion cracking.

The foregoing is a description corresponding in substance to German Application No. P 37 08 507.7, dated Mar. 16, 1987, the International priority of which is being claimed for the instant application, and which is hereby made part of this application. Any material discrepancies between the foregoing specification and the aforementioned corresponding German application are to be resolved in favor of the latter.

We claim:

1. Method for manufacturing rotatable parts of rotary machines having a hub bore in a hub region with a central axis, which comprises pre-turning a contour at the hub region having a shape as seen in the direction of the central axis differing from the shape of a hub contour to be produced, performing the step of pre-turning the contour by forming regions of the pre-turned contour being oversized by a given amount as compared to the hub contour to be produced, and by forming at least one additional ring being oversized as compared to the hub contour to be produced by an amount greater than the given amount, heat-treating at least the hub region of a rotatable part, cooling at least the hub region having the pre-turned contour with a coolant fluid after the heat-treatment to produce internal compressive strains in the hub region, and reducing the pre-turned contour after the cooling to the hub contour to be produced.

2. Method according to claim 1, which comprises forming the regions of the pre-turned contour being oversized by a given amount as compared to the hub contour to be produced as axially outer regions of the pre-turned contour.

3. Method for manufacturing rotatable parts of rotary machines having a hub bore in a hub region with a central axis, which comprises pre-turning a contour at the hub region having a shape as seen in the direction of the central axis differing from the shape of a hub contour to be produced, performing the step of pre-turning the contour by forming regions of the pre-turned contour being oversized by approximately 5 to 50 mm as compared to the hub contour to be produced, and by forming at least one additional ring being oversized as compared to the hub contour to be produced by approximately 50 to 150 mm, heat-treating at least the hub region of a rotatable part, cooling at least the hub region having the pre-turned contour with a coolant fluid after the heat-treatment to produce internal compressive strains in the hub region, and reducing the pre-turned contour after the cooling to the hub contour to be produced.

4. Method for manufacturing rotatable parts of rotary machines having a hub bore in a hub region with a central axis, which comprises pre-turning a contour at the hub region having a shape as seen in the direction of the central axis differing from the shape of a hub contour to be produced, performing the step of pre-turning the contour by forming regions of the pre-turned contour being oversized by approximately 10 mm as compared to the hub contour to be produced, and by forming at least one additional ring being oversized as compared to the hub contour to be produced by approximately 70 mm, heat-treating at least the hub region of a rotatable part, cooling at least the hub region having the pre-turned contour with a coolant fluid after the heat-treatment to produce internal compressive strains in the hub region, and reducing the pre-turned contour after the cooling to the hub contour to be produced.

* * * * *